US 6,687,437 B1

(12) United States Patent
Starnes et al.

(10) Patent No.: US 6,687,437 B1
(45) Date of Patent: Feb. 3, 2004

(54) HYBRID DATA COMMUNICATIONS CABLE

(75) Inventors: James W. Starnes, Woodstock, GA (US); Christopher W. McNutt, Woodstock, GA (US)

(73) Assignee: Essex Group, Inc., Fort Wayne, IN (US)

( * ) Notice: Subject to any disclaimer, the term of this patent is extended or adjusted under 35 U.S.C. 154(b) by 0 days.

(21) Appl. No.: 09/587,562

(22) Filed: Jun. 5, 2000

(51) Int. Cl.[7] .................................................. G02B 6/44
(52) U.S. Cl. ..................................... 385/101; 174/113 R
(58) Field of Search .............................. 385/100–113; 174/113 R, 113 C, 131 A

(56) References Cited

U.S. PATENT DOCUMENTS

| 2,204,737 | A | | 6/1940 | Swallow et al. ............... 174/28 |
| 4,778,246 | A | | 10/1988 | Carroll ..................... 350/96.23 |
| 5,268,971 | A | | 12/1993 | Nilsson et al. ............... 385/101 |
| 5,539,851 | A | | 7/1996 | Taylor et al. ................ 385/101 |
| 5,557,698 | A | | 9/1996 | Gareis et al. ................ 385/101 |
| 5,651,081 | A | | 7/1997 | Blew et al. .................. 385/101 |
| 5,677,974 | A | | 10/1997 | Elms et al. .................. 385/101 |
| 5,789,711 | A | | 8/1998 | Gaeris et al. ................ 174/113 |
| 6,195,487 | B1 | * | 2/2001 | Anderson et al. ............ 385/101 |
| 6,195,488 | B1 | * | 2/2001 | Song .......................... 385/101 |
| 6,239,363 | B1 | * | 5/2001 | Wooters ...................... 174/47 |
| 6,239,379 | B1 | * | 5/2001 | Cotter et al. ............ 174/110 R |
| 6,411,760 | B1 | * | 6/2002 | Avellanet .................... 385/104 |
| 6,596,944 | B1 | * | 7/2003 | Clark et al. ............. 174/113 C |

* cited by examiner

Primary Examiner—Michael C. Zarroli
(74) Attorney, Agent, or Firm—Rader, Fishman & Grauer, PLLC

(57) ABSTRACT

A hybrid data communications cable includes optical fibers and insulated electrical conductors. The cable includes an elongated filler member having a central portion, walls extending radially from the central portion and a conduit running the length of the filler member. The optical fibers are enclosed within the conduit, and at least one insulated electrical conductor is separated from another insulated electrical conductor by one or more walls of the filler member. The cable further includes a jacket that encloses the filler member and the insulated electrical conductors.

16 Claims, 1 Drawing Sheet

HYBRID DATA COMMUNICATIONS CABLE

BACKGROUND OF THE INVENTION

1. Field of Invention

The present invention relates to hybrid cables having both optical and electrical transmission media.

2. Discussion

Fiber optic cables are increasingly used to transmit video, voice, and data. Optical fiber offers advantages of small size, lightweight, large bandwidth and high transmission data rates. Unlike traditional metal wire, optical fiber is immune to electromagnetic interference, which adversely affects transmission quality.

Although optical fiber often performs better than traditional metallic media, the telecommunications industry continues to purchase metal wire for many reasons. For example, existing telecommunications hardware is often incapable of sending and receiving optical transmissions without costly modification. Furthermore, even as the telecommunication industry upgrades to equipment that can send and receive optical signals, it continues to use hardware that depends on metal wire for signal transmission.

Consequently, there is a need for cables that can transmit both electrical and optical signals.

SUMMARY OF THE INVENTION

The present invention provides a novel hybrid data communications cable that can be efficiently manufactured without compromising the quality of electrical and optical signals transmitted by the cable.

The hybrid data communications cable includes a filler member having a longitudinal axis, and a conduit embedded in the filler member approximately parallel to the longitudinal axis. The filler member includes a central portion and walls extending radially from the central portion. The filler member, which is typically reinforced with elongated strength members or fillers, includes one or more optical fibers. The cable also includes a first and second group of insulated conductors that are separated from each other by at least one of the walls. Furthermore, the cable includes a jacket for housing the elongated filler member and the insulated electrical conductors.

DETAILED DESCRIPTION OF THE PREFERRED EMBODIMENTS

Figure 1:
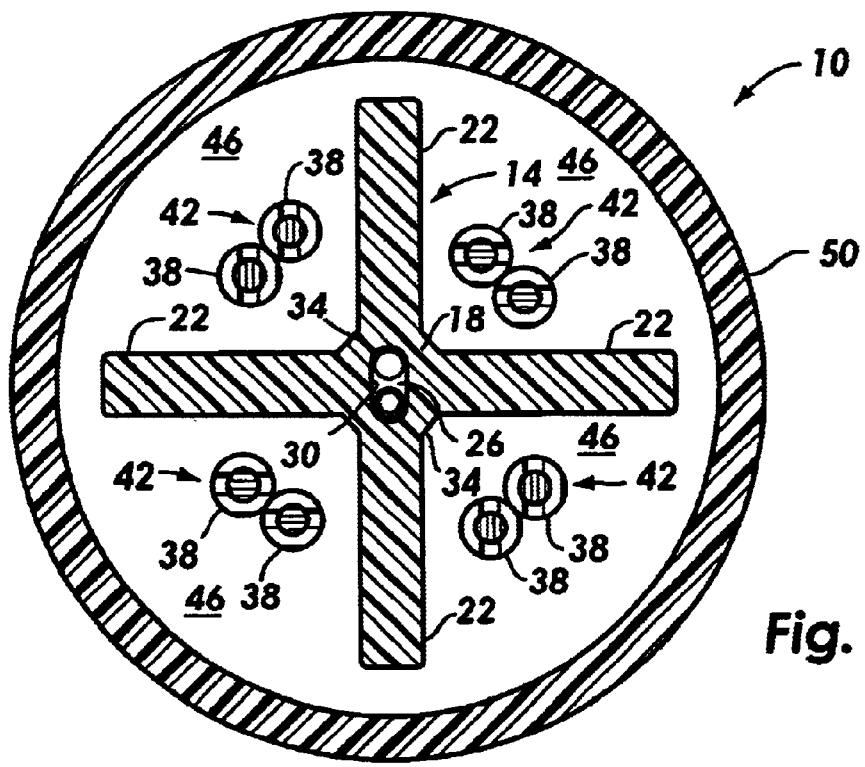
FIG. 1 illustrates a cross-sectional view of one embodiment of a hybrid cable.

FIG. 1 illustrates a cross-section of one embodiment of a hybrid cable 10. The cable 10 comprises a filler member 14 that extends along a longitudinal axis of the cable 10. The filler member 14 includes a central portion 18, and walls 22 extending radially from the central portion 18. The filler member 14 may be oriented such that the walls 22 remain in their respective planes along the longitudinal axis. Alternatively, the filler 14 member is either helically or SZ twisted along its longitudinal axis, which facilitates midspan access of the cable 10. The filler member 14 is typically made from one or more thermoplastic materials. Useful thermoplastics include, but are not limited to polyethylene, polypropylene, polyester, polystyrene, poly(ethylene terephthalate), poly(vinyl fluoride), poly(vinyl chloride), halogenated and non-halogenated poly(vinylidenes), polyamide, and polytetrafluoroethylene. Other useful filler member 14 materials include polymeric elastomers, cross-linked polymers, copolymers, ultraviolet light curable polymers, and the like. The filler member 14 may be formed by extrusion, pultrusion, or cut from solid polymer.

The filler member 14 may also include elongated strength members or discrete reinforcing particles. Strength members can include metal rods, or continuous fiber bundles of glass, nylon, graphite, oriented, liquid crystalline polymers or aramid (e.g. KEVLAR). In one embodiment, the filler member 14 may be extruded over one or more aramid fiber strength members such that the strength members extend along the longitudinal axis of the cable 10 within the central portion 18 or the walls 22 of the filler member 14. In another embodiment, the strength members may be metal rods extending radially outward from the central portion 18 within the walls 22 of the filler member 14. The filler member 14 may also comprise extruded oriented liquid crystalline polymers. Discrete reinforcing particles may also be used to add strength to the filler member 14. These particles are typically dispersed throughout the filler member 14. Useful reinforcing particles include metal shavings, glass fibers, aramid fibers, graphite fibers, carbon black, clays, and nucleators such as talc or sodium benzoate.

As shown in FIG. 1, a conduit 26 extends along the longitudinal axis of the cable 10 within the central portion 18 of the filler member 14. The conduit 26 is generally cylindrical and is defined by a cylindrical surface 30. Other conduits (not shown) may extend down the length of one of the walls 22, generally parallel to the longitudinal axis of the cable.

The hybrid cable 10 also includes one or more optical fibers 34 enclosed in the conduit 26. The optical fibers 34 may be loose fibers, tight buffered fibers, or fiber ribbons, and typically extend down the entire length of the filler member 14. The optical fibers 34 may be single-mode, multi-mode or a mixture of optical fibers (glass or plastic) depending on their intended use and should have a protective coating. Furthermore, the optical fibers 34 may be color-coded for identification purposes.

The size and shape of the conduit 26 can vary depending on the size, number and shape of the optical fibers 34. The conduit 26 should provide the optical fibers 34 with enough space to allow the cable 10 to bend without placing excessive stress on the optical fibers 34. The inner surface 30 of the conduit 26 may contact the optical fibers 34 if the filler member 14 and the optical fibers 34 have similar coefficients of thermal expansion. If the coefficients of thermal expansion of the filler member 14 and the optical fibers 34 are dissimilar, a buffering material may be needed to separate the optical fibers 34 from the filler member 14 to avoid damage to the optical fibers 34. Suitable materials include, but are not limited to powder, gel and aramid fibers.

The optical fibers 34 can be placed in the conduit 26 in several ways. For example, the filler member 14 may be extruded over the optical fibers 34 so that the conduit 26 surrounds the optical fibers 34. Alternatively, the optical fibers 34 may be pulled through the conduit 26 after the filler member 14 is formed, or the optical fibers 34 may be placed in the conduit 26 through a slit in the wall of the conduit 26 that is later sealed using adhesives, welding or other suitable sealing techniques.

As shown in FIG. 1, the cable 10 also includes insulated conductors 38. The conductors 38 are typically single or multi-stranded copper wires insulated with one or more polymeric layers. Useful polymeric insulations include thermoset, thermoplastic, and ultraviolet light curable polymers. Examples of these include, but are not limited to polyamide, polyamideimide, polyethylene, polyester, polyaryl sulfone, polyacrylates and the like.

The conductors 38 can be arranged in several configurations. For example, FIG. 1 shows twisted pairs 42 of insulated conductors 38 separated by the walls 22 of the filler member 14. Each of the twisted pairs 42 is comprised of two insulated conductors 38. The twisted pairs 42 are separated into zones 50. Pairs of adjacent walls 22 and a portion of a cable jacket 50 define each of the zones 46. In FIG. 1, there are four zones 46, but the number of zones 46 can vary depending on the number of walls 22. The walls 22 decrease cross talk between twisted pairs 42. To further decrease cross talk, the walls 22 may be made of a semi-conductive filled or unfilled polymer. Useful semi-conductive filled polymers include polyethylene, polypropylene, polystyrene and the like containing conductive particles, such as carbon black, graphite fiber, barium ferrite, and metal flakes, fibers or powders. Other useful semi-conductive polymers include intrinsically conductive polymers such as polyacetylene and polyphtalocyanine doped with gallium or selenium.

The cable 10 shown in FIG. 1 has one twisted pair 42 in each of the zones 46, but the zones may also contain many other arrangements of conductors.

Figure 2:
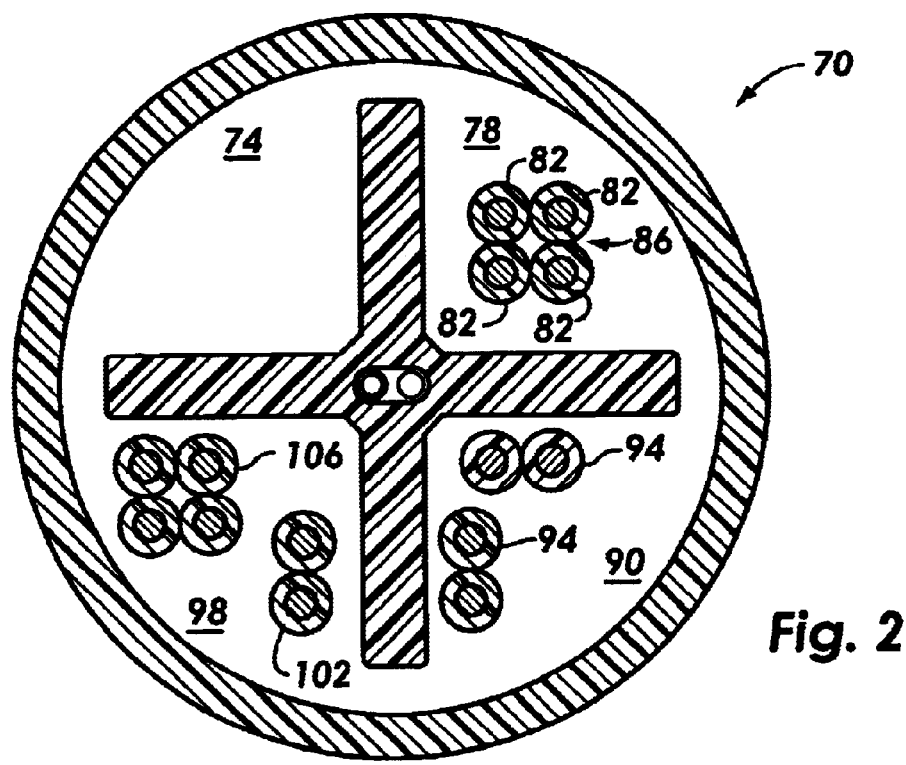
FIG. 2 illustrates a cross-sectional view of another embodiment of a hybrid cable.

FIG. 2 illustrates other possible arrangements of conductors within another hybrid cable 70. For example, a first zone 74 has no conductors. A second zone 78 has a group of conductors comprised of four insulated conductors 82 twisted together to form a conductor bundle 86. A third zone 90 contains two twisted pairs 94 of insulated conductors. A fourth zone 98 contains a twisted pair 102 and a conductor bundle 106. A person of skill in the art will appreciate that many other arrangements are possible. The particular arrangement will depend on design criteria including signal to noise ratio and signal throughput.

Referring again to FIG. 1, the jacket 50, which encloses the filler member 14 and the conductors 38, is typically made of plastic material. Preferably, the plastic material is flame retardant. Suitable plastic materials include, but are not limited to polyethylene, polypropylene, polyvinyl chloride, or non-halogenated flame-retardant materials. The plastic material may be made and installed through any number of methods known in the art, including extrusion or tape wrapping. The jacket 46 may or may not contact the walls 22 along the length of cable 10.

What is claimed is:

1. A hybrid data communications cable comprising:
    a filler member having a longitudinal axis and a conduit formed therein approximately parallel to the longitudinal axis, the filler member having a central portion and walls extending radially from the central portion;
    a first optical fiber and a second optical fiber enclosed in the conduit;
    a first group and a second group of insulated electrical conductors, the first group of insulated electrical conductors separated from the second group of insulated electrical conductors by at least one of the walls, wherein the first group and the second group of insulated electrical conductors are twisted pairs; and
    a jacket surrounding the filler member and the first and second group of insulated electrical conductors, the conduit formed within the central portion of the filler member.

2. The hybrid data communications cable of claim 1, wherein the first optical fiber is a ribbon.

3. The hybrid data communications cable of claim 1, wherein the first optical fiber is a single-mode glass optical fiber.

4. The hybrid data communications cable of claim 1, wherein the first optical fiber is a multi-mode glass optical fiber.

5. The hybrid data communications cable of claim 1, wherein at least one of the first optical fiber and the second optical fiber are color-coded for identification purposes.

6. The hybrid data communications cable of claim 1, further including a buffering material within the conduit.

7. The hybrid data communications cable of claim 1, further comprising at least one elongated strength member embedded in the filler member.

8. The hybrid data communications cable of claim 1, further comprising elongated strength members which are one of aramid fiber, glass fiber and metal rod.

9. The hybrid data communications cable of claim 1, wherein the filler member and the optical fiber have similar coefficients of thermal expansion.

10. A hybrid data communications cable comprising:
    a filler member having a longitudinal axis and a conduit formed therein approximately parallel to the longitudinal axis, the filler member having a central portion and walls extending radially from the central portion;
    an optical fiber enclosed in the conduit, the optical fiber being substantially separated from the filler member by a buffering material;
    first and second insulated twisted pair electrical conductors, the first insulated twisted pair separated from the second insulated twisted pair by at least one of the walls; and
    a jacket surrounding the elongated filler member and the first and the second insulated twisted pair electrical conductors.

11. A hybrid data communication, cable comprising:
    a filler member having a longitudinal axis and a conduit formed therein approximately parallel to the longitudinal axis, wherein the filler member includes a central portion and walls extending radially from the central portion;
    an optical fiber enclosed in the conduit, the optical fiber having a coefficient of thermal expansion similar to the filler;
    first and second insulated twisted pairs of electrical conductors, the first insulated twisted pair separated from the second insulated twisted pair by at least one of the walls; and
    a jacket surrounding the elongated filler member and the first and second insulated twisted pairs of electrical conductors.

12. A hybrid data communications cable comprising:
    a filler member having a longitudinal axis and a conduit formed therein approximately parallel to the longitudinal axis, the filler member having a central portion and walls extending radially from the central portion, the conduit formed in at least one of the walls of the filler member;
    a first optical fiber enclosed in the conduit;
    a first group and a second group of insulated electrical conductors, the first group of insulated electrical conductors separated from the second group of insulated electrical conductors by at least one of the walls; and a jacket surrounding the filler member and the first and second group of insulated electrical conductors.

13. The hybrid data communications cable of claim 12, wherein the first group and the second group of insulated electrical conductors are twisted pairs.

14. A hybrid data communications cable, comprising:

a filler member having a longitudinal axis and a conduit formed therein approximately parallel to the longitudinal axis, the filler member having a central portion and walls extending radially from the central portion, the walls made of a polymer filled with conductive particles;

a first optical fiber enclosed in the conduit;

a first group and a second group of insulated electrical conductors, the first group of insulated electrical conductors separated from the second group of insulated electrical conductors by at least one of the walls; and a jacket surrounding the filler member and the first and second group of insulated electrical conductors, the conduit formed within the central portion of the filler member.

15. A hybrid data communications cable comprising:

a filler member having a longitudinal axis and a conduit formed therein approximately parallel to the longitudinal axis, the filler member having a central portion and walls extending radially from the central portion, the walls made of an intrinsically conductive polymer;

a first optical fiber enclosed in the conduit;

a first group and a second group of insulated electrical conductors, the first group of insulated electrical conductors separated from the second group of insulated electrical conductors by at least one of the walls; and a jacket surrounding the filler member and the first and second group of insulated electrical conductors, the conduit formed within the central portion of the filler member.

16. A hybrid data communications cable comprising:

a filler member having a longitudinal axis and a conduit formed therein approximately parallel to the longitudinal axis, the filler member having a central portion and walls extending radially from the central portion, the filler member comprising reinforcing particles;

a first optical fiber enclosed in the conduit;

a first group and a second group of insulated electrical conductors, the first group of insulated electrical conductors separated from the second group of insulated electrical conductors by at least one of the walls; and a jacket surrounding the filler member and the first and second group of insulated electrical conductors, the conduit formed within the central portion of the filler member.

* * * * *